No. 870,421. PATENTED NOV. 5, 1907.
J. H. EDWARDS.
PLOW.
APPLICATION FILED JULY 25, 1907.

2 SHEETS—SHEET 1.

Witnesses:

Inventor
Johnathan H. Edwards,
By
Attorneys

No. 870,421. PATENTED NOV. 5, 1907.
J. H. EDWARDS.
PLOW.
APPLICATION FILED JULY 25, 1907.

2 SHEETS—SHEET 2.

Witnesses:

Inventor:
Johnathan H. Edwards,
By
Attorney

UNITED STATES PATENT OFFICE.

JOHNATHAN H. EDWARDS, OF GILBERTSVILLE, KENTUCKY.

PLOW.

No. 870,421.  Specification of Letters Patent.  Patented Nov. 5, 1907.

Application filed July 25, 1907. Serial No. 385,533.

*To all whom it may concern:*

Be it known that I, JOHNATHAN H. EDWARDS, a citizen of the United States, residing at Gilbertsville, in the county of Marshall and State of Kentucky, have invented certain new and useful Improvements in Plows, of which the following is a specification.

My invention relates to improvements in plows. Its objects are to reduce friction in the travel of the plow; to lessen the draft upon the horse; to exclude falling dirt, resulting from the lifting or turning of the earth by the action of the plow, from the wheel-axle or journal; and to carry out these objects in a simple, economic and effective manner.

Said invention consists of structural features or instrumentalities substantially as hereinafter fully disclosed and pointed out by the claims.

Figure 1:
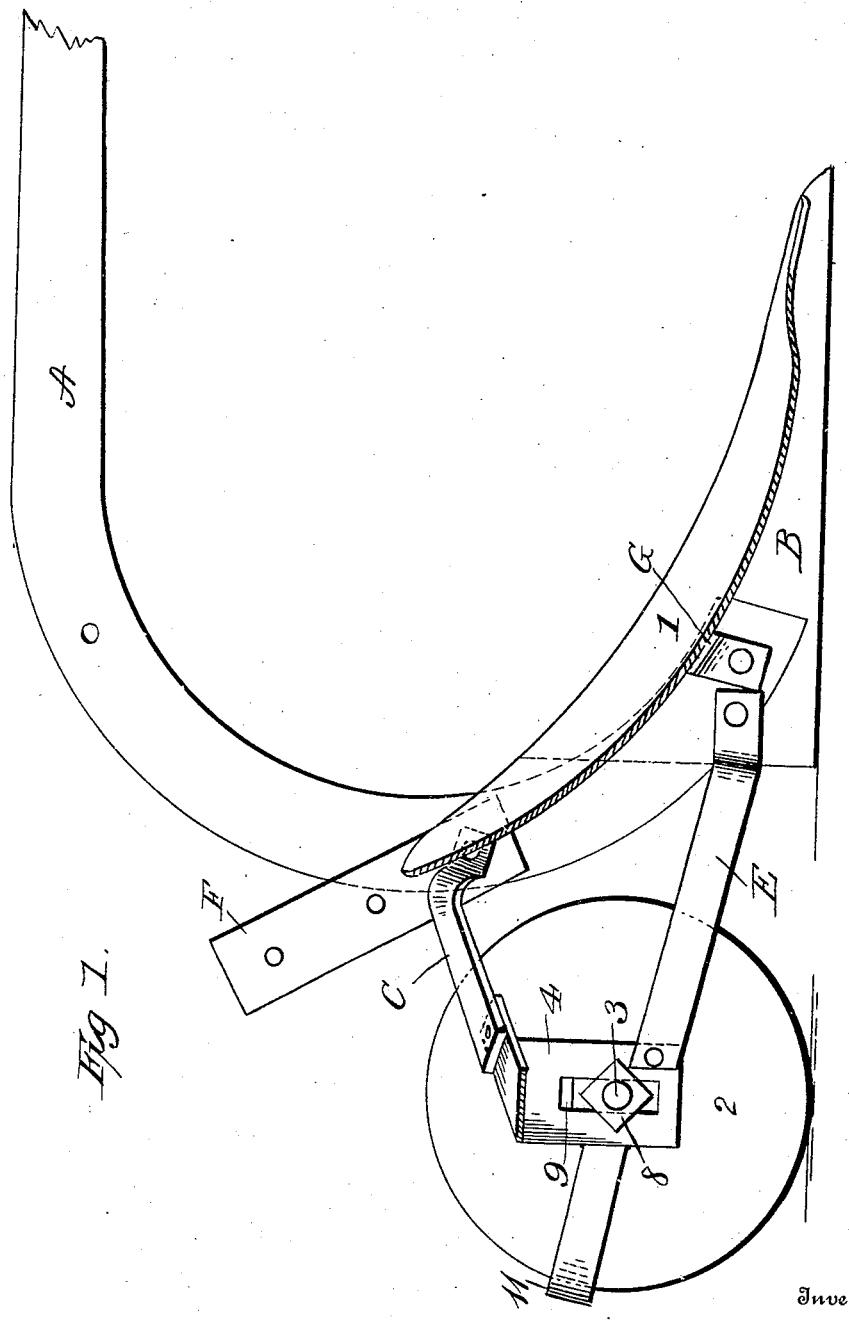
Figure 3:
Figure 2:
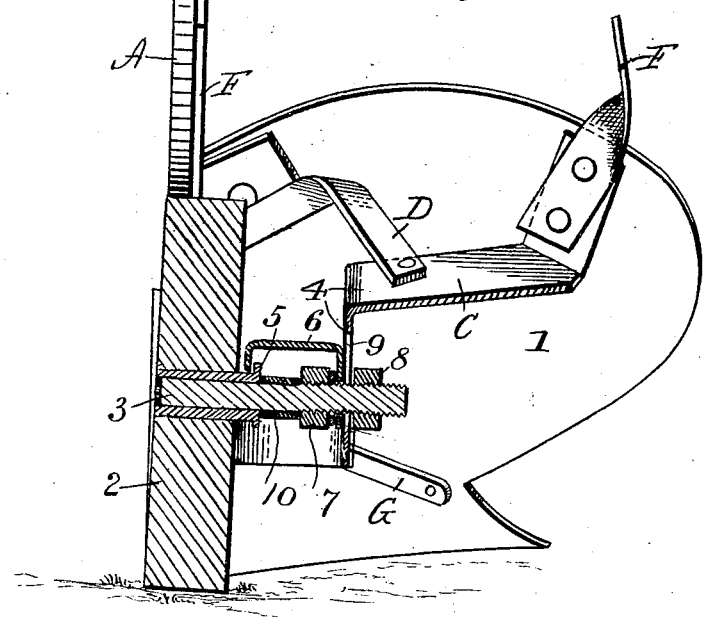

In the accompanying drawing illustrating the preferred embodiment of my invention—Figure 1 is a vertical longitudinal section thereof, taken through the moldboard. Fig. 2 is a transverse section vertically through the wheel and axle. Fig. 3 is a view of the axle.

A represents a plow beam and 1 is the moldboard. The forward edge of the moldboard is secured to the land side B in the usual manner, and the lower end of the beam A is securely bolted or riveted to the inner face of the land side beneath the moldboard.

A bracket C is secured to the lower face of the moldboard at or near the rearward end thereof. This bracket extends laterally toward the beam and thence downwardly in a vertical direction to form the arm 4 and the latter is provided with an elongated vertically disposed slot 9. An axle is screw threaded at one end as shown in Figs. 2 and 3 and the nuts 7 and 8 retain it in place at the required adjustment in the slot 9. On the outer end of the axle the hub of the wheel 2 is journaled.

The inner end of the hub is provided with a flange 5. A plate 6 is preferably secured between the arm 4 and the nut 7 by means of the latter, and this plate extends over the axle and its outer end is bent downwardly and over-reaches the flange 5 on the hub of the wheel. This plate thus has the double function namely of serving as a mud guard and also as a means for retaining the wheel on the axle, thus dispensing with a nut on the wheel end of the axle, the bore of the hub extending only part way through the wheel. A spacing sleeve 10 on the axle retains the wheel in position. A scraper 11 is preferably held in place by the nut 7 which holds the mud guard, and the outer end of this scraper extends in close proximity to the rear of the wheel whereby to remove any mud accumulating on its rim.

The brace D extends from the brace C to the beam, and a brace E extends from the lower end of the arm 4 to the lower end of the beam, these braces both being securely bolted or riveted at their ends, and still another brace G extends laterally from the lower end of the plow beam to the lower side of the moldboard as shown in Fig. 2. The handles (not shown) are secured to the straps F, F.

From the foregoing it will be seen that a simple and rigid plow is provided, which is capable of being easily adjusted to regulate the depth of furrow, and at the same time the entire construction is made substantial by rigid bracing.

I claim—

1. In a plow, the combination with a beam, land side, and moldboard, of a brace having a depending vertically slotted arm, said brace secured to the moldboard, an axle adjustably secured to the slotted arm, a wheel having a flanged hub mounted on the axle and a mud guard secured over the axle and over-reaching the flange on the hub.

2. In a plow, the combination with a beam, land side, and moldboard, of a brace having a depending vertically slotted arm, said brace secured to the moldboard, an axle adjustably secured in the slotted arm, a wheel having a flanged hub mounted on the axle, a mud guard secured over the axle and over-reaching the flange on the hub, a mud scraper projecting rearwardly from the arm, and braces extending from the brace and the lower end of the arm to the plow beam.

3. In a plow, the combination with a beam, land side and moldboard, of a brace having a depending slotted arm, an axle screw threaded at one end, said screw threaded end extending through the slot in the arm, nuts on said threaded end on each side of the arm for adjustably securing the axle to the arm, and a wheel mounted on the other end of the axle.

In testimony whereof I affix my signature, in presence of two witnesses.

JOHNATHAN H. EDWARDS.

Witnesses:
  GEORGE W. BOTTORFF,
  ROBT. PACE.